United States Patent
Fujikawa et al.

(10) Patent No.: US 8,624,135 B2
(45) Date of Patent: Jan. 7, 2014

(54) SWITCH UNIT

(75) Inventors: Yukinori Fujikawa, Tsu (JP); Hideaki Itou, Niwa-gun (JP); Takumi Kuroki, Niwa-gun (JP)

(73) Assignees: Panasonic Corporation, Osaka (JP); Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 178 days.

(21) Appl. No.: 13/228,722

(22) Filed: Sep. 9, 2011

(65) Prior Publication Data

US 2012/0061225 A1  Mar. 15, 2012

(30) Foreign Application Priority Data

Sep. 10, 2010 (JP) .................................. 2010-202934

(51) Int. Cl.
*H01H 15/06* (2006.01)
(52) U.S. Cl.
USPC ........................ 200/5 A; 200/16 R; 200/550
(58) Field of Classification Search
USPC .. 200/547–550, 5 R, 5 A, 5 B, 17 R, 18, 6 R, 200/6 A; 345/161
See application file for complete search history.

(56) References Cited

U.S. PATENT DOCUMENTS

| | | | | |
|---|---|---|---|---|
| 3,271,532 A * | 9/1966 | Lopez | ............................ | 200/6 A |
| 5,845,535 A | 12/1998 | Wakabayashi et al. | | |
| 6,362,810 B1 * | 3/2002 | Matsuda | ........................ | 345/161 |
| 6,555,769 B2 * | 4/2003 | Stefura | ........................... | 200/5 R |
| 6,700,565 B2 * | 3/2004 | Niiyama | ........................ | 200/5 A |
| 6,861,594 B2 * | 3/2005 | Sadowski et al. | .............. | 200/5 R |
| 2007/0045088 A1 * | 3/2007 | Hecht | ............................ | 200/5 A |

FOREIGN PATENT DOCUMENTS

JP  09-196153 A  7/1997

* cited by examiner

*Primary Examiner* — Felix O Figueroa
(74) *Attorney, Agent, or Firm* — Edwards Wildman Palmer LLP; James E. Armstrong, IV; Carolina E. Save

(57) ABSTRACT

A switch unit for detecting movement of a target object in a first direction and in a second direction orthogonal to the first direction includes a first movable body arranged to move in the first direction together with the movement of the target object in the first direction, a first substrate provided with a first detecting unit for detecting a position of the first movable body in the first direction, a second movable body arranged to move in the second direction together with the movement of the target object in the second direction, and a second substrate provided with a second detecting unit for detecting a position of the second movable body in the second direction.

6 Claims, 20 Drawing Sheets

SWITCH UNIT

FIELD OF THE INVENTION

The present invention relates to a switch unit.

BACKGROUND OF THE INVENTION

Conventionally available is a switch unit for detecting movement of a target object in two mutually orthogonal directions. The switch unit is used to detect, e.g., the movement (or position) of a shift lever in a motor vehicle. The switch unit of this type is disclosed in, e.g., Japanese Patent Application Publication No. H9-196153.

The shift lever for a motor vehicle is moved along first, second and third shift routes L1, L2 and L3 as illustrated in FIG. 17. The first shift route L1 is used in an automatic mode (AT mode) having "P", "R", "N" and "D" ranges. The second shift route L2 is connected to the "D" range. The second shift route L2 is formed into a rectilinear shape to extend in a direction orthogonal to the first shift route L1 and is used in switching an automatic shift mode and a manual shift mode (MT mode), which is called a mode switching operation.

The third shift route L3 is provided with a "+" range at one end thereof, an "S" range connected to the second shift route L2 and a "−" range at the other end thereof. The third shift route L3 is formed into a rectilinear shape to extend in a direction substantially perpendicular to the second shift route L2.

If the shift lever is moved along the second shift route L2 from the "D" range of the first shift route L1 to the "S" range of the third shift route L3, the AT mode is switched to the MT mode. Up-shift is performed by moving the shift lever along the third shift route L3 from the "S" range to the "+" range (by shifting the shift lever upwards). Down-shift is carried out by moving the shift lever from the "S" range to the "−" range (by shifting the shift lever downwards). If an external force is removed from the shift lever after the up-shift or the down-shift, the shift lever is automatically returned back to the "S" range (the neutral position).

As shown in FIG. 18, the switch unit includes a first switch SW1 for detecting the movement of the shift lever between the "S" range and the "D" range and second and third switches SW2 and SW3 for detecting the movement of the shift lever from the "S" range to the "+" range and the "−" range.

In other words, the switch unit includes three switches, i.e., the first, second and third switches SW1, SW2 and SW3. The switches SW1, SW2 and SW3 are stored within three cases 101, 102 and 103, one switch in each case. The cases 101, 102 and 103 are accommodated in a housing H.

As can be seen in FIG. 19, a terminal unit 104 is arranged within the housing H of the switch unit. The terminal unit 104 includes three terminals 104a. Lead wires (not shown) drawn out from the three switches SW1, SW2 and SW3 are connected to the terminals 104a by soldering or other bonding methods.

The conventional switch unit stated above is provided with the switches SW1, SW2 and SW3 for detecting three kinds of operations, namely the mode switching operation, the up-shift operation and the down-shift operation. This poses a problem in that the number of parts becomes greater and the size of the switch unit grows bigger.

Moreover, the three switches SW1, SW2 and SW3 are stored within the individual cases 101, 102 and 103 which in turn are accommodated in the housing H. This leads to a problem in that the size of the housing H becomes larger.

In addition, the lead wires need to be connected to the respective switches SW1, SW2 and SW3 and also need to be soldered to the respective terminals 104a of the terminal unit 104 arranged in the housing H. This also poses a problem in that the number of parts gets increased.

DISCLOSURE OF THE INVENTION

In view of the above, the present invention provides a switch unit which is structurally simple and small in size.

In accordance with an embodiment of the invention, there is provided a switch unit for detecting movement of a target object in a first direction and in a second direction orthogonal to the first direction. The switch unit includes: a first movable body arranged to move in the first direction together with the movement of the target object in the first direction; a first substrate provided with a first detecting unit for detecting a position of the first movable body in the first direction; a second movable body arranged to move in the second direction together with the movement of the target object in the second direction; and a second substrate provided with a second detecting unit for detecting a position of the second movable body in the second direction.

The switch unit may further include a first fixed terminal for outputting a signal corresponding to the position of the first movable body, the first fixed terminal being connected to the first detecting unit and extending in the second direction; and a second fixed terminal for outputting a signal corresponding to the position of the second movable body, the second fixed terminal being connected to the second detecting unit and arranged side by side with respect to the first fixed terminal.

The first movable body and the second movable body may be arranged at one surface side of the first substrate, and the first fixed terminal and the second fixed terminal may be arranged at one surface side of the first substrate.

The first detecting unit may include a plurality of first fixed contact points arranged side by side along the first direction, the first movable body being connectable to the first fixed contact points such that a connection state between the first movable body and the first fixed contact points varies with the position of the first movable body, the second connecting unit including a plurality of second fixed contact points arranged side by side within a plane extending in the second direction, the second movable body being connectable to the second fixed contact points such that a connection state between the second movable body and the second fixed contact points varies with the position of the second movable body.

The first detecting unit may include three first fixed contact points arranged side by side along the first direction, the first movable body being connectable to the first fixed contact points such that a connection state between the first movable body and the first fixed contact points varies with the position of the first movable body, the second connecting unit including two second fixed contact points arranged side by side within a plane extending in the second direction, the second movable body being connectable to the second fixed contact points such that a connection state between, the second movable body and the second fixed contact points varies with the position of the second movable body.

The switch unit may further include a first fixed terminal for outputting a signal corresponding to the position of the first movable body, the first fixed terminal being connected to the first detecting unit and extending in the second direction; and a second fixed terminal for outputting a signal corresponding to the position of the second movable body, the second fixed terminal being connected to the second detecting unit and arranged side by side with respect to the first fixed terminal, the first fixed terminal and the first fixed contact points being integrally formed with each other, the second fixed terminal and the second fixed contact points being integrally formed with each other.

The first detecting unit may include a first molded member for fixing the first fixed contact points together, the first fixed contact points being included in the first detecting unit, the second detecting unit including a second molded member for fixing the second fixed contact points together, the second fixed contact points being included in the second detecting unit.

The switch unit may further include a first fixed terminal for outputting a signal corresponding to the position of the first movable body, the first fixed terminal being connected to the first detecting unit and extending in the second direction; a second fixed terminal for outputting a signal corresponding to the position of the second movable body, the second fixed terminal being connected to the second detecting unit and arranged side by side with respect to the first fixed terminal; and a molded member integrally molded with the first fixed terminal and the second fixed terminal to fix the first fixed terminal and the second fixed terminal together.

With the present invention, it is possible to provide a switch unit which is structurally simple and small in size.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

A preferred embodiment of the present invention will now be described with reference to the accompanying drawings which form a part hereof.

A switch unit according to an embodiment will be described with reference to FIGS. 1 through 16. In the following description, the up-down direction, the left-right direction and the front-rear direction will be defined based on the directions shown in FIG. 1. The front-rear direction is orthogonal to the up-down direction and the left-right direction.

Figure 17:
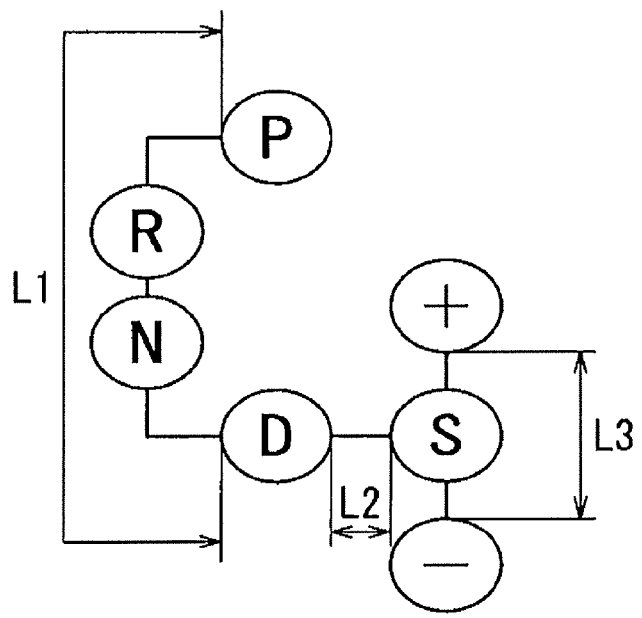
FIG. 17 is a diagram illustrating a shift pattern of a motor vehicle.
Figure 18:
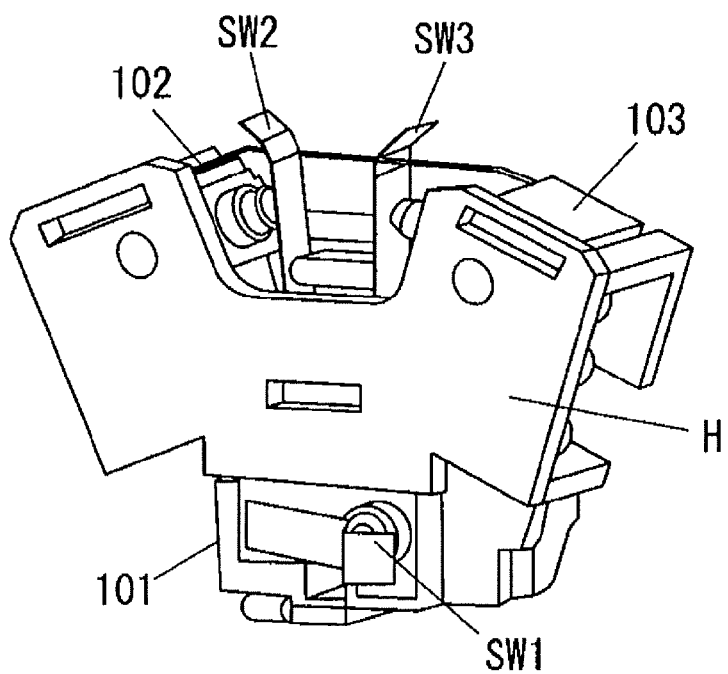
FIG. 18 is a perspective view showing a conventional switch unit.

The switch unit of the present embodiment is used to detect, e.g., the movement (or position) of a shift lever (a target object) in a motor vehicle. The shift lever for a motor vehicle is moved along first, second and third shift routes L1, L2 and L3 just like the conventional one illustrated in FIG. 17.

The first shift route L1 is used in an automatic mode (AT mode) having "P", "R", "N" and "D" ranges. The second shift route L2 is connected to the "D" range. The second shift route L2 is formed into a rectilinear shape to extend in a direction orthogonal to the first shift route L1 and is used in switching an automatic shift mode and a manual shift mode (MT mode), which is called a mode switching operation.

The third shift route L3 is provided with a "+" range at one end thereof, an "S" range connected to the second shift route L2 and a "−" range at the other end thereof. The third shift route L3 is formed into a rectilinear shape to extend in a direction substantially perpendicular to the second shift route L2.

If the shift lever is moved along the second shift route L2 from the "D" range of the first shift route L1 to the "S" range of the third shift route L3, the AT mode is switched to the MT mode. Up-shift is performed by moving the shift lever along the third shift route L3 from the "S" range to the "+" range (by shifting the shift lever upwards). Down-shift is carried out by moving the shift lever from the "S" range to the "−" range (by shifting the shift lever downwards). In the following description, the up-shift operation and the down-shift operation will be collectively referred to as shift changeover operation.

If an external force is removed from the shift lever after the up-shift or the down-shift, the shift lever is automatically returned back to the "S" range (the neutral position).

The switch unit of the present embodiment is designed to detect the operation (movement) of the shift lever moving along two mutually-orthogonal shift routes (the first shift route L1 and the second shift route L2).

Description will now be made on the configuration of the switch unit according to the present embodiment.

Figure 1:
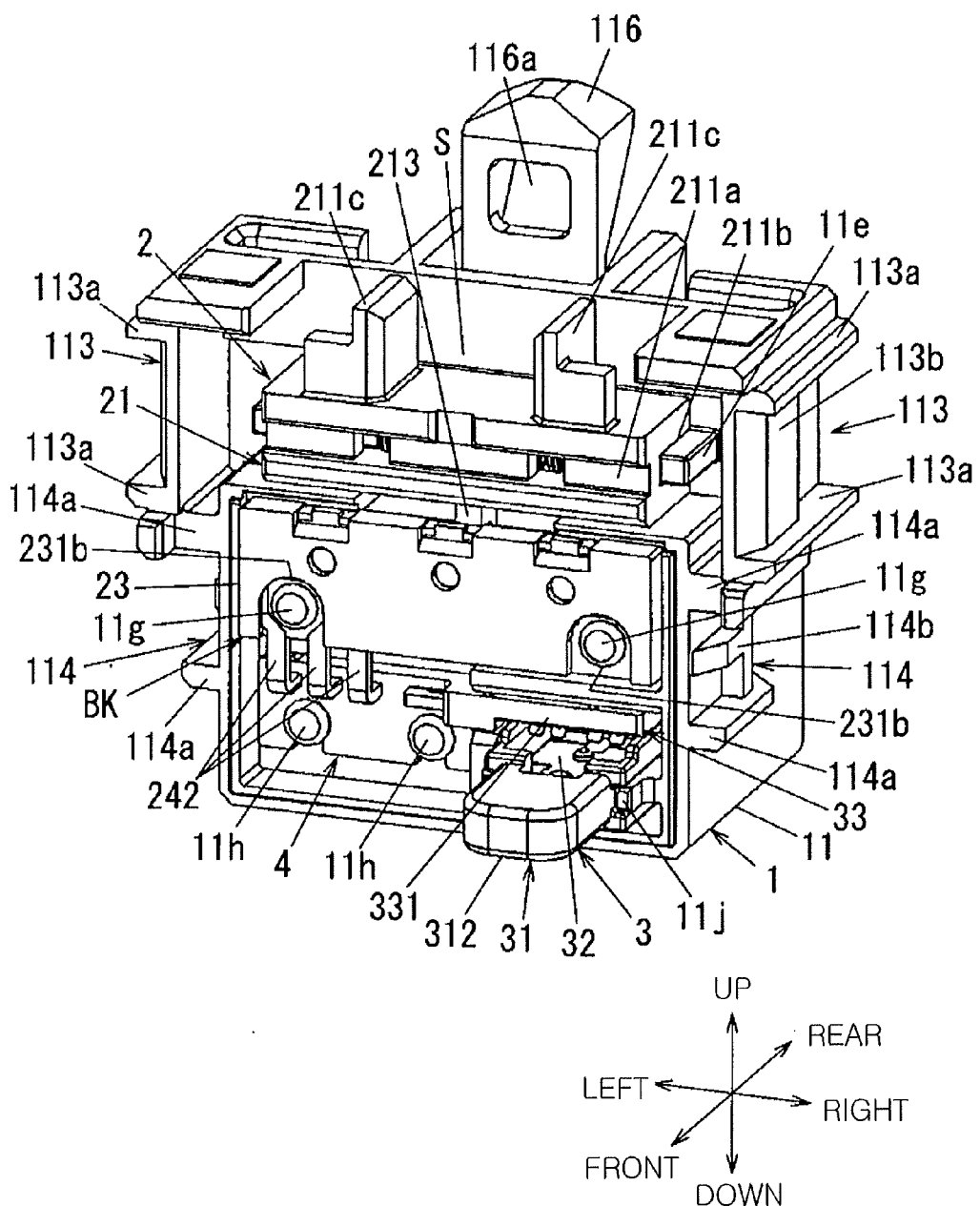
FIG. 1 is a sectional perspective view showing a switch unit in accordance with one embodiment of the present invention.

Referring to FIG. 1, the switch unit of the present embodiment includes first and second movable bodies 21 and 31, a fixed terminal block BK and a case 1 for storing the movable bodies 21 and 31 and the fixed terminal block BK. The movable body 21 is moved in concert with the shift changeover operation in the third shift route L3. The movable body 31 is moved in concert with the mode switching operation in the second shift route L2.

Figure 2A:
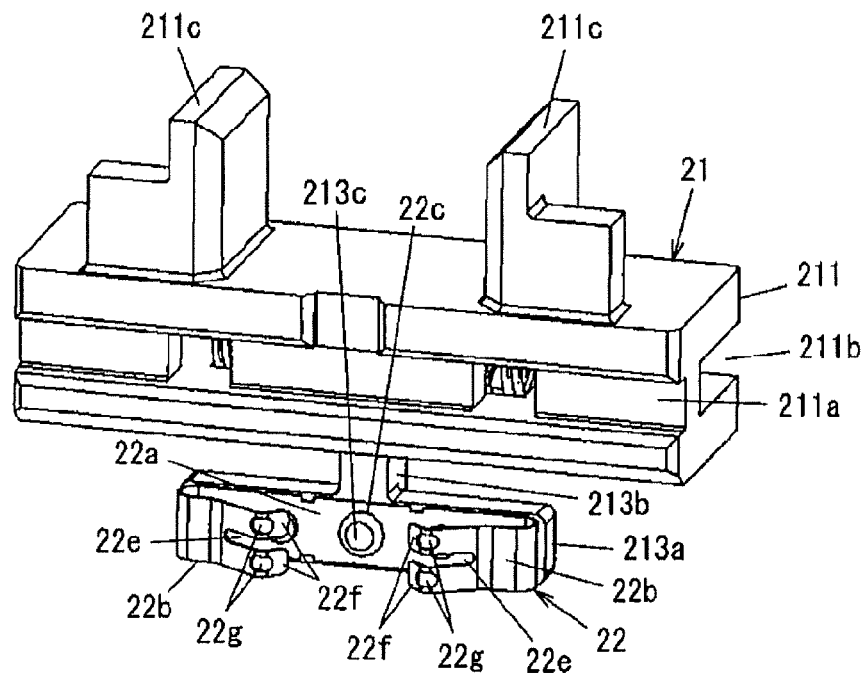
FIGS. 2A, 2B and 2C are schematic views illustrating a movable body employed in the switch unit.
Figure 2B:
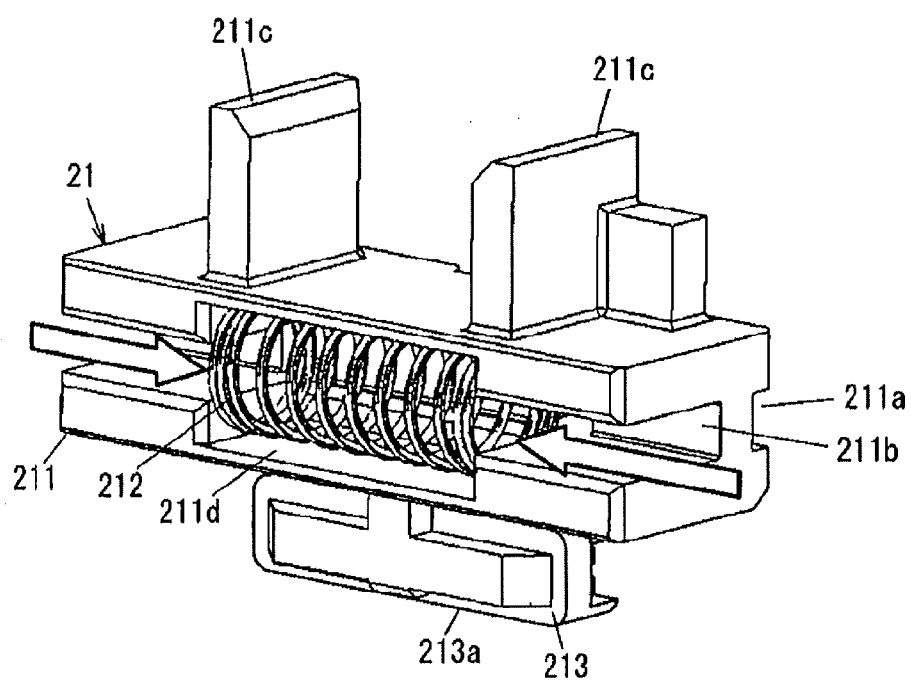
Figure 2C:
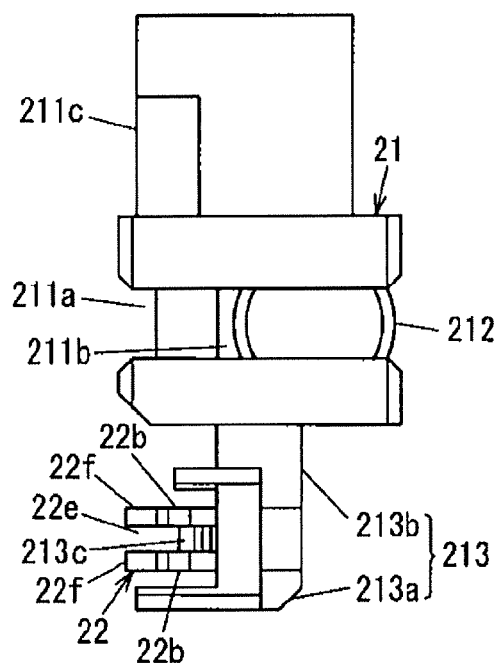

As shown in FIGS. 2A, 2B and 2C, the movable body 21 includes a base 211, a return spring 212 formed of a coil spring and arranged within the base 211, a movable terminal stand 213 extending from the lower surface of the base 211 and a movable contact member 22 fixed to the movable terminal stand 213. FIG. 2B is a rear view of the movable body 21.

The base 211 has groove portions 211a and 211b formed on the front and rear surfaces thereof to extend in the left-right direction. Thus, the base 211 is formed into a substantially H-like cross section. The base 211 includes a pair of substantially L-like wall portions 211c formed on the upper surface thereof. The wall portions 211c are opposed to each other with a specified gap left therebetween in the left-right direction.

The base 211 further includes a substantially rectangular recess portion 211d formed substantially at the center of the rear surface thereof. The return spring 212 is held within the recess portion 211d in a compressed state such that the expansion/contraction direction thereof runs in the left-right direction.

The movable terminal stand 213 includes a rectangular parallelepiped base portion 213a extending in the left-right direction and a connecting piece 213b extending upwards from the substantially central area of the left-right direction of the base portion 213a and joined to the substantially central area of the lower surface of the base 211. Thus, the movable terminal stand 213 is formed into a substantially T-like shape. The movable terminal stand 213 further includes a substantially cylindrical columnar caulking projection 213c protruding from the substantially central area of the front surface of the base portion 213a.

As can be seen in FIG. 2A, the movable contact member 22 is formed by bending about 180 degrees the longitudinal opposite ends of a strip-shaped metal plate. The movable contact member 22 includes a rectangular plate-like base plate 22a and bent pieces 22b formed by bending the longitudinal opposite ends of the base plate 22a.

The base plate 22a has an insertion hole 22c formed in the substantially central area thereof. The caulking projection 213c of the movable terminal stand 213 is inserted into the insertion hole 22c and is subjected to thermal caulking, whereby the movable contact member 22 is fixed to the movable terminal stand 213.

The bent pieces 22b are formed by bending and imparted with elasticity. Each of the bent pieces 22b has a cutout 22e formed by cutting away the tip end portion thereof in the left-right direction. As a consequence, a pair of parallel contact pieces 22f is formed in the tip end portion of each of the bent pieces 22b with the cutout 22e interposed therebetween. The tip end portions of the contact pieces 22f are bulged in the thickness direction thereof to form bulging portions 22g having a substantially-triangular cross section. This increases the thickness direction elasticity of the contact pieces 22f. In the movable contact member 22, the bent pieces 22b are bent substantially 180 degrees with respect to the base plate 22a fixed to the movable terminal stand 213 by thermal caulking. Therefore, when the bulging portions 22g of the contact pieces 22f make contact with fixed contact portions 24a to be described later, a force is applied on the base plate 22a in such a direction as to press the base plate 22a against the movable terminal stand 213. As a result, a force acts on the movable contact member 22 in a direction opposite to the direction in which the movable contact member 22 is removed from the caulking projection 213c of the movable terminal stand 213. This makes it possible to prevent the movable contact member 22 from being detached from the movable terminal stand 213.

Figure 3A:
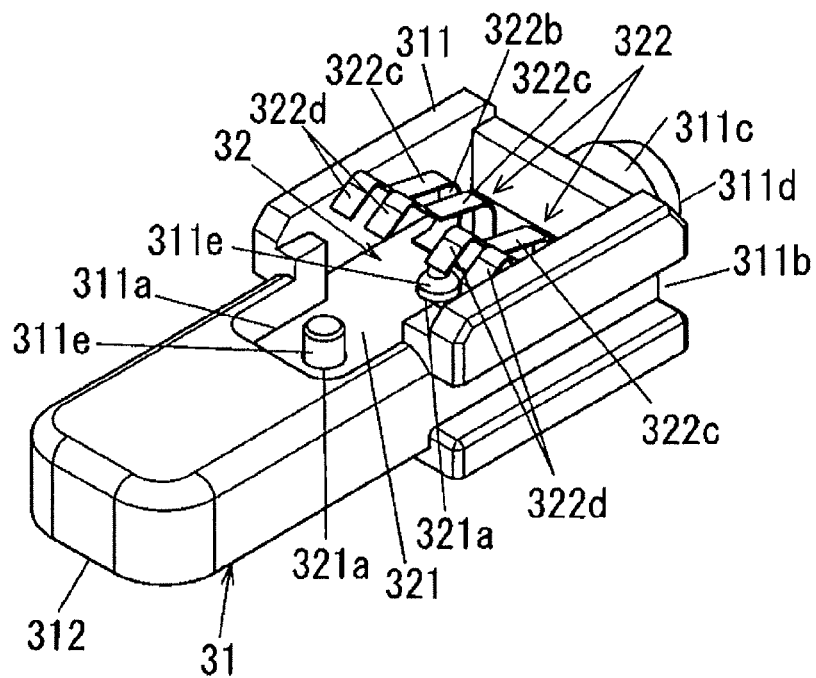
FIGS. 3A and 3B are schematic views illustrating another movable body employed in the switch unit.
Figure 3B:
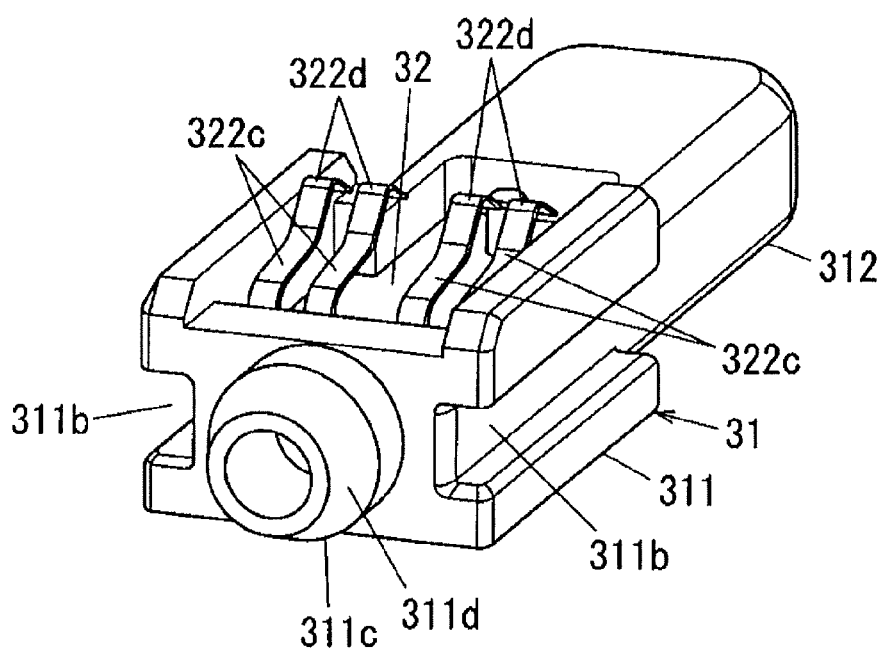

Turning to FIGS. 3A and 3B, the movable body 31 includes a substantially rectangular parallelepiped body portion 311, a substantially rectangular parallelepiped operation portion 312 protruding from the front surface of the body portion 311 and a movable contact member 32 fixed to the body portion 311.

The body portion 311 has a substantially rectangular recess portion 311a formed on the upper surface thereof. The movable contact member 32 is held within the recess portion 311a. The body portion 311 further has a pair of slide grooves 311b formed on the left and right side surfaces thereof to extend in the front-rear direction. The body portion 311 includes a substantially cylindrical protrusion 311c formed in the substantially central area of the rear surface thereof. The protrusion 311c has a slant portion 311d whose diameter gets gradually increased from the tip end portion toward the base end portion thereof.

The operation portion 312 is formed into a substantially rectangular parallelepiped shape to have a thickness smaller than that of the body portion 311. The front end portion of the operation portion 312 is chamfered into a round shape. The operation portion 312 is integrally formed with the body portion 311.

The movable contact member 32 includes a rectangular plate-like base plate 321 and a pair of bent piece 322 extending from one end edge of the base plate 321 in one end direction and then bent 180 degrees. Thus, the movable contact member 32 is formed into a substantially Y-like shape. The movable contact member 32 is arranged within the recess portion 311a with the bent pieces 322 thereof facing rearwards.

As shown in FIG. 3A, the base plate 321 has two insertion holes 321a spaced apart from each other in the front-rear direction. Two substantially-cylindrical columnar caulking projections 311e protruding from the bottom surface of the recess portion 311a are inserted into the insertion holes 321a and are subjected to thermal caulking, whereby the movable contact member 32 is fixed to the movable body 31.

The bent piece 322 is imparted with elasticity and formed into a substantially C-like shape. A cutout 322b is formed in the tip end portion of the bent piece 322 to extend in the extension direction of the bent piece 322. As a consequence, a pair of parallel contact pieces 322c is formed in the tip end portion of each bent piece 322 with the cutout 322b interposed between the parallel contact pieces 322c. Bulging portions 322d bulging in the thickness direction of the contact pieces 322c are formed in the tip end portions of the contact pieces 322c. In the movable contact member 32, the bent piece 322 is bent substantially 180 degrees with respect to the base plate 321 fixed to the body portion 311 by thermal caulking. Therefore, when the bulging portions 322d of the contact pieces 322c make contact with fixed contact portions 341a to be described later, a force is applied on the base plate 321 in such a direction as to press the base plate 321 against the body portion 311. As a result, a force acts on the movable contact member 32 in a direction opposite to the direction in which the movable contact member 32 is removed from the caulking projections 311e of the body portion 311. This makes it possible to prevent the movable contact member 32 from being detached from the body portion 311.

Figure 4A:
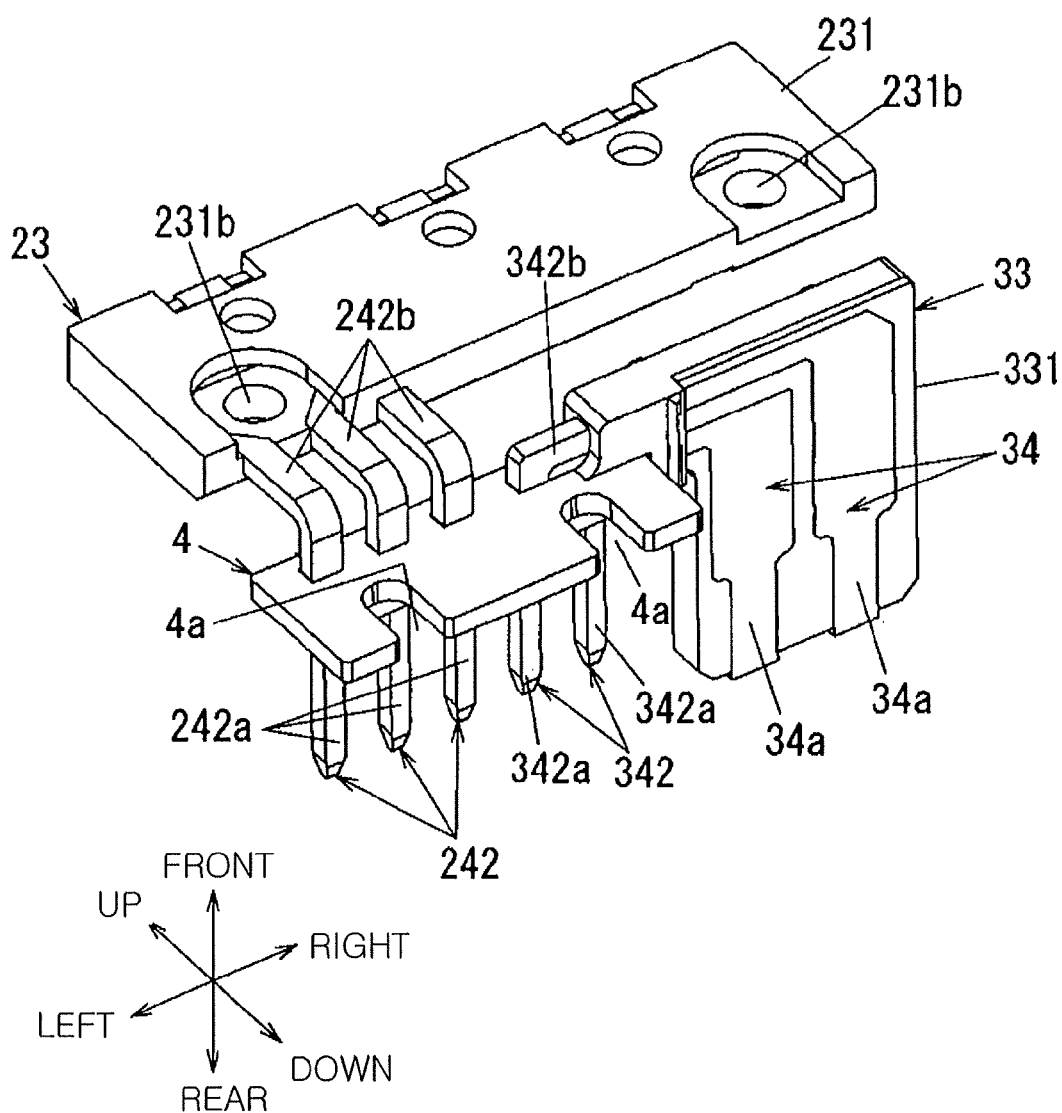
FIGS. 4A and 4B are schematic views illustrating a fixed terminal block employed in the switch unit.
Figure 4B:
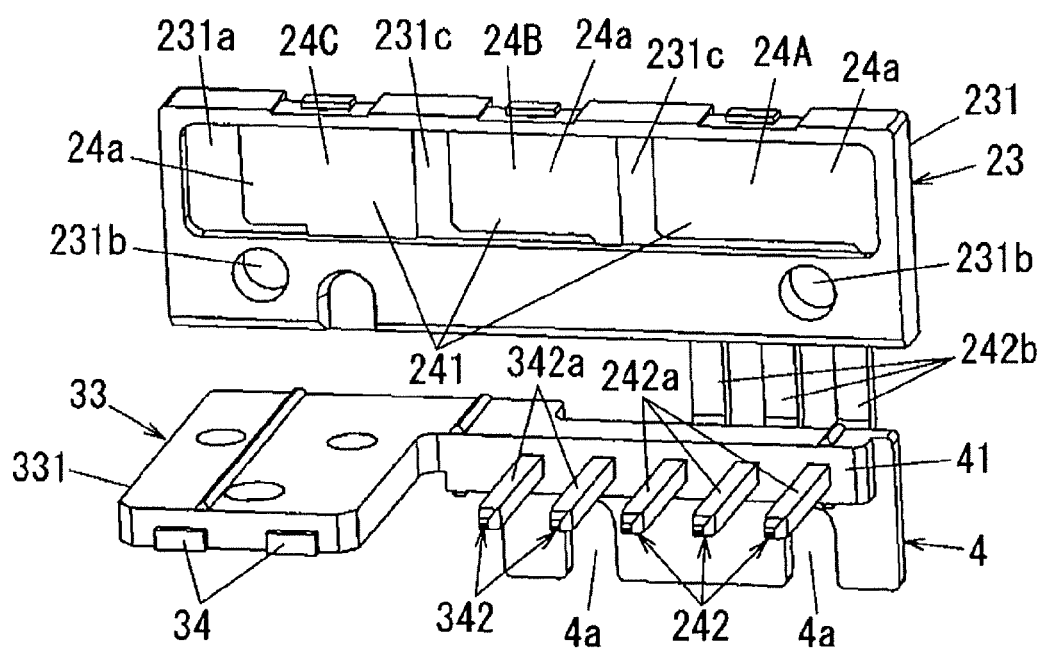

Referring to FIGS. 4A and 4B, the fixed terminal block BK includes a fixed terminal stand 23 (a first substrate) arranged in the up-down direction, a fixed terminal stand 33 (a second substrate) positioned below the fixed terminal stand 23 and arranged in the front-rear direction, and a terminal holding body 4 (a third molded member) integrally formed with fixed terminal stand 33. The fixed terminal stand 23 and the movable body 21 make up a shift detecting switch 2 for detecting the shift changeover operation. The fixed terminal stand 33 and the movable body 31 make up a mode switching switch 3 for detecting the mode switching operation.

The fixed terminal stand 23 includes a molded plate 231 (a first molded member) formed into a rectangular shape from a resin material and arranged in the up-down direction, and three fixed contact terminals 24 (24A, 24B and 24C) (a first detecting unit) integrally formed with the molded plate 231 and made of a metallic material.

As shown in FIG. 4B, the molded plate 231 has three recess portions 231a formed in the substantially upper half area of the rear surface thereof and arranged side by side in the left-right direction. Insertion holes 231b are formed in the left and right lower areas of the rear surface of the molded plate 231.

The fixed contact terminals 24 include fixed contact plates 241 formed in the molded plate 231 and fixed terminals 242 (first fixed terminals) integrally formed with the fixed contact plates 241 and protruding outwards from the left marginal area of the lower surface of the molded plate 231.

Figure 5:
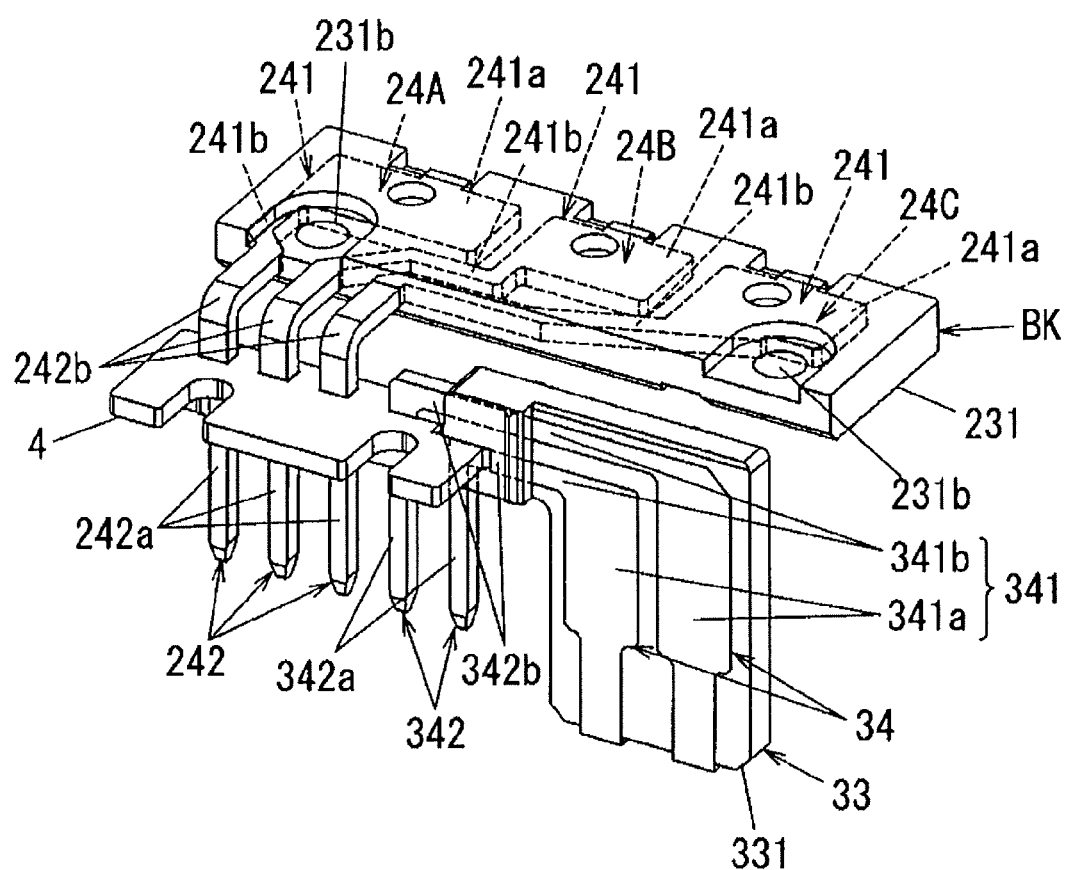
FIG. 5 is a perspective view of the fixed terminal block employed in the switch unit.

Referring to FIG. 5, the fixed contact plates 241 include rectangular plate-like fixed contact portions 241a attached to the bottom surfaces of the recess portions 231a of the molded plate 231 and extension portions 241b extending from the fixed contact portions 241a through the molded plate 231 and joined to the fixed terminals 242. The three fixed contact terminals 24 will be referred to as fixed contact terminals 24A, 24B and 24C in the named order from the left side in FIG. 5. If there is no need to distinguish the fixed contact terminals 24A, 24B and 24C from each other, the fixed contact terminals 24A, 24B and 24C will be collectively referred to as fixed contact terminals 24.

Each of the fixed terminals 242 includes a connecting portion 242b extending downwards from the tip end of each of the extension portions 241b and protruding outwards away from the molded plate 231 and a terminal portion 242a extending rearwards from the tip end of the connecting portion 242b. Thus, the fixed terminals 242 are formed into a substantially L-like shape. In this regard, the three fixed terminals 242 joined to the fixed contact terminals 24 are arranged side by side in the left-right direction.

The fixed terminal stand 33 includes a substantially rectangular plate-like molded plate 331 (a second molded member) formed in the substantially perpendicular direction (the front-rear direction) with respect to the formation direction of the fixed terminal stand 23 (the up-down direction) and arranged at the lower rear side of the fixed terminal stand 23, and a pair of fixed contact terminals 34 (a second detecting unit) formed on the lower surface of the molded plate 331.

The molded plate 331 is formed into a substantially rectangular plate-like shape from a resin material.

The fixed contact terminals 34 are made of a metallic material. Each of the fixed contact terminals 34 includes a fixed contact plate 341 arranged on the lower surface of the molded plate 331 and a fixed terminal 342 (a second fixed terminal) integrally formed with the fixed contact plate 341 and protruding outwards from the left surface of the molded plate 331.

The fixed contact plates 341 of the fixed contact terminals 34 includes fixed contact portions 341a formed into a substantially rectangular plate-like shape and arranged side by side on the lower surface of the molded plate 331 in the left-right direction and extension portions 341b extending to the left from the fixed contact portions 341a and joined to the fixed terminals 342.

Each of the fixed terminals 342 includes a connecting portion 342b extending to the left from the tip end of each of the extension portions 341b and protruding outwards away from the molded plate 331 and a terminal portion 342a extending rearwards from the tip end of the connecting portion 342b. Thus, the fixed terminals 342 are formed into a substantially L-like shape. In the two fixed terminals 342 joined to the two fixed contact terminals 34, the connecting portions 342b are arranged side by side in the front-rear direction. The terminal portions 342a are arranged side by side in the left-right direction near the terminal portions 242a.

As shown in FIG. 4A, the terminal holding body 4 extends to the left from the left end of the molded plate 331 and is arranged below the fixed terminal stand 23 in a side-by-side relationship with the fixed terminal stand 33. The terminal holding body 4 is formed into a substantially rectangular plate-like shape. As illustrated in FIG. 4B, the thickness of the upper half area of the rear surface of the terminal holding body 4 is set greater than the thickness of the lower half area thereof, thereby providing a terminal holding portion 41. The terminal holding portion 41 is integrally formed with the terminal portions 242a and 342a of the fixed terminals 242 and 342 which extend through the terminal holding portion 41 in the front-rear direction. In other words, the terminal holding body 4 and the fixed terminal stands 23 and 33 are integrally formed with each other by simultaneous molding. Accordingly, the fixed terminal block BK is formed into a single piece by simultaneous molding.

In the terminal holding body 4, two cutouts 4a extending upwards from the lower end of the terminal holding body 4 are formed at a specified interval in the left-right direction. The inner end of each of the cutouts 4a is formed into a semicircular shape so that the below-mentioned locating protrusions 11h can be fitted to the cutouts 4a.

Figure 6:
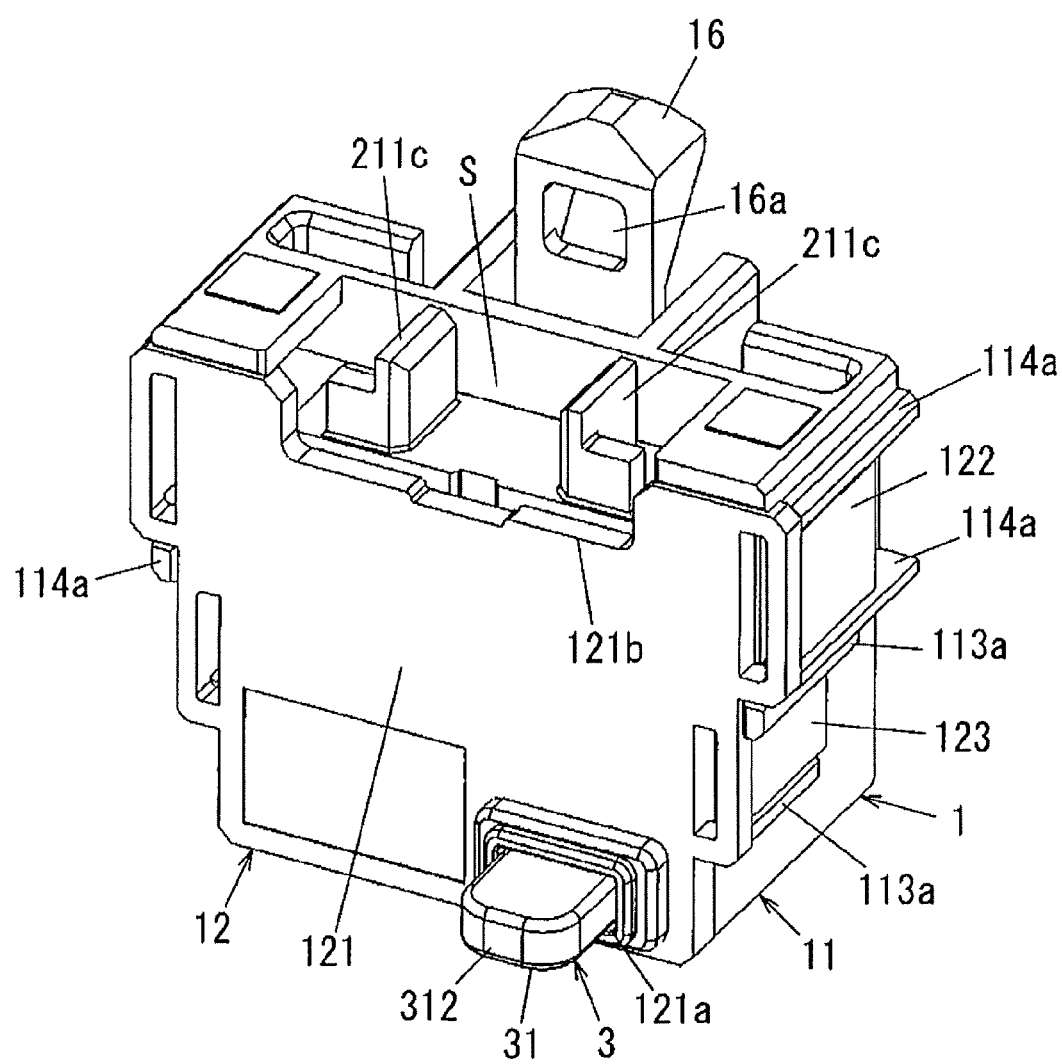
FIG. 6 is a perspective view of the switch unit.

Referring to FIG. 6, the case 1 includes a substantially rectangular box-shaped case body 11 with a front opening and a case cover 12 covering the front opening of the case body 11.

Figure 7:
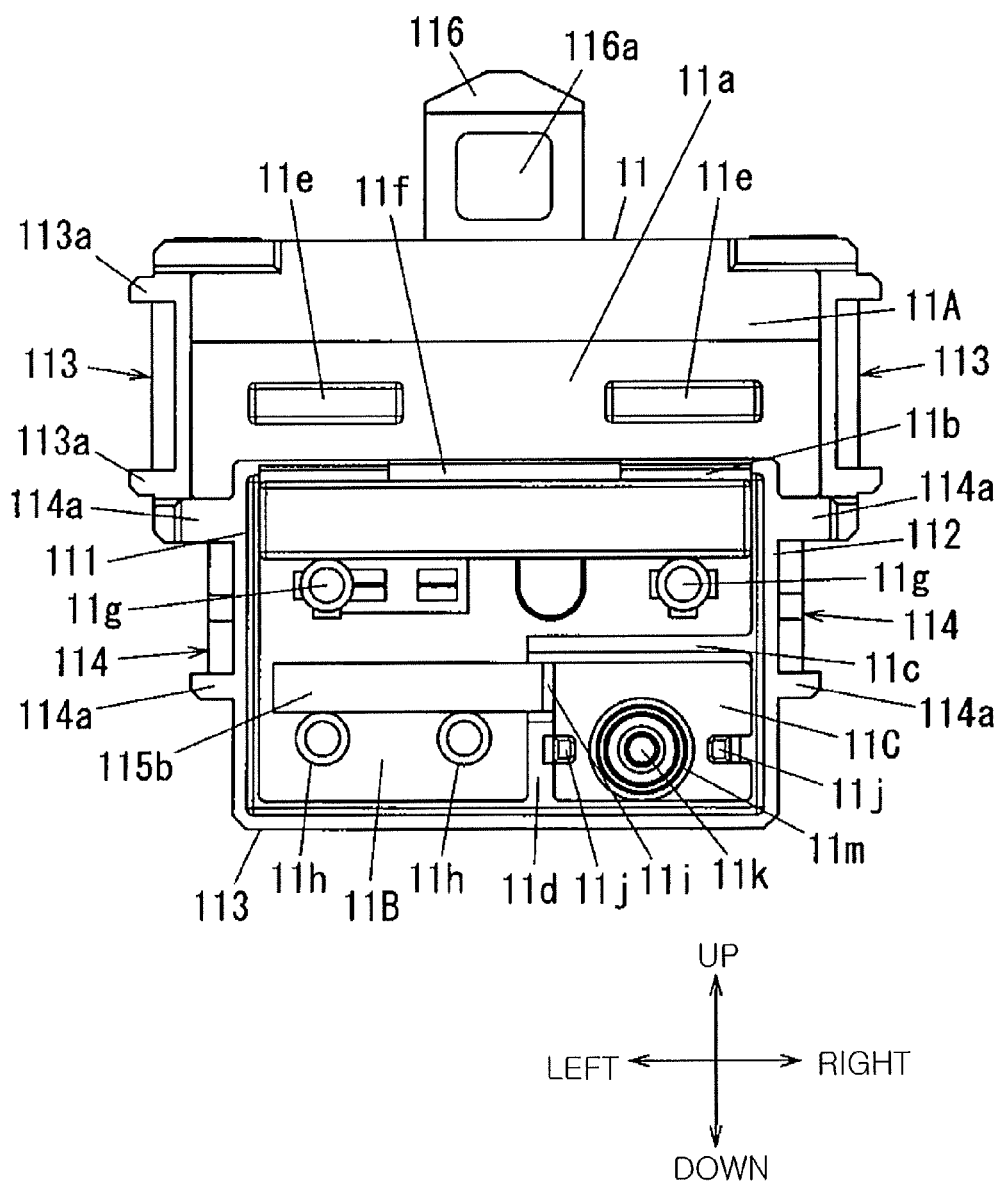
FIG. 7 is a front view illustrating a housing employed in the switch unit.
Figure 8:
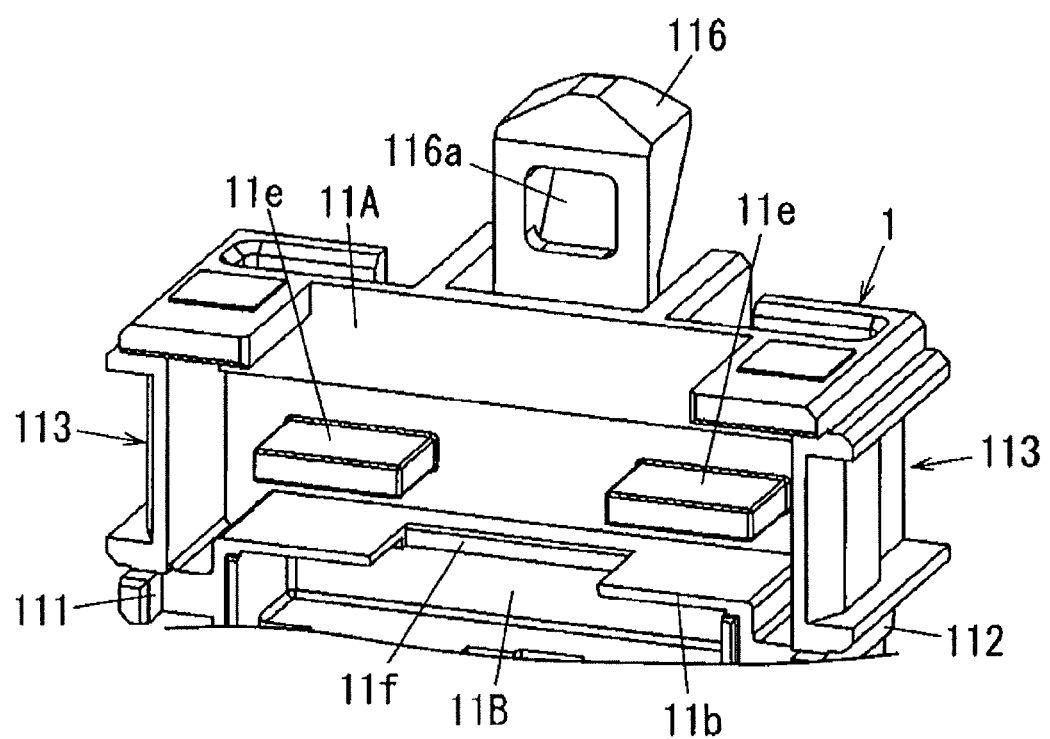
FIG. 8 is an enlarged view depicting major portions of the housing of the switch unit.

As shown in FIGS. 7 and 8, the case body 11 includes a partition wall 11b extending upright from a rear surface 11a and interconnecting left and right side walls 111 and 112. The internal space of the case body 11 is bisected in the up-down direction by the partition wall 11b to form a substantially rectangular upper storage compartment 11A and a substantially rectangular lower storage compartment 11B.

Within the storage compartment 11A, a pair of guide protrusions 11e extending from the rear surface 11a of the case body 11 is arranged side by side in the left-right direction. The guide protrusions 11e are formed into a rectangular parallelepiped shape along the left-right direction and are arranged at a specified interval in the left-right direction.

Figure 9:
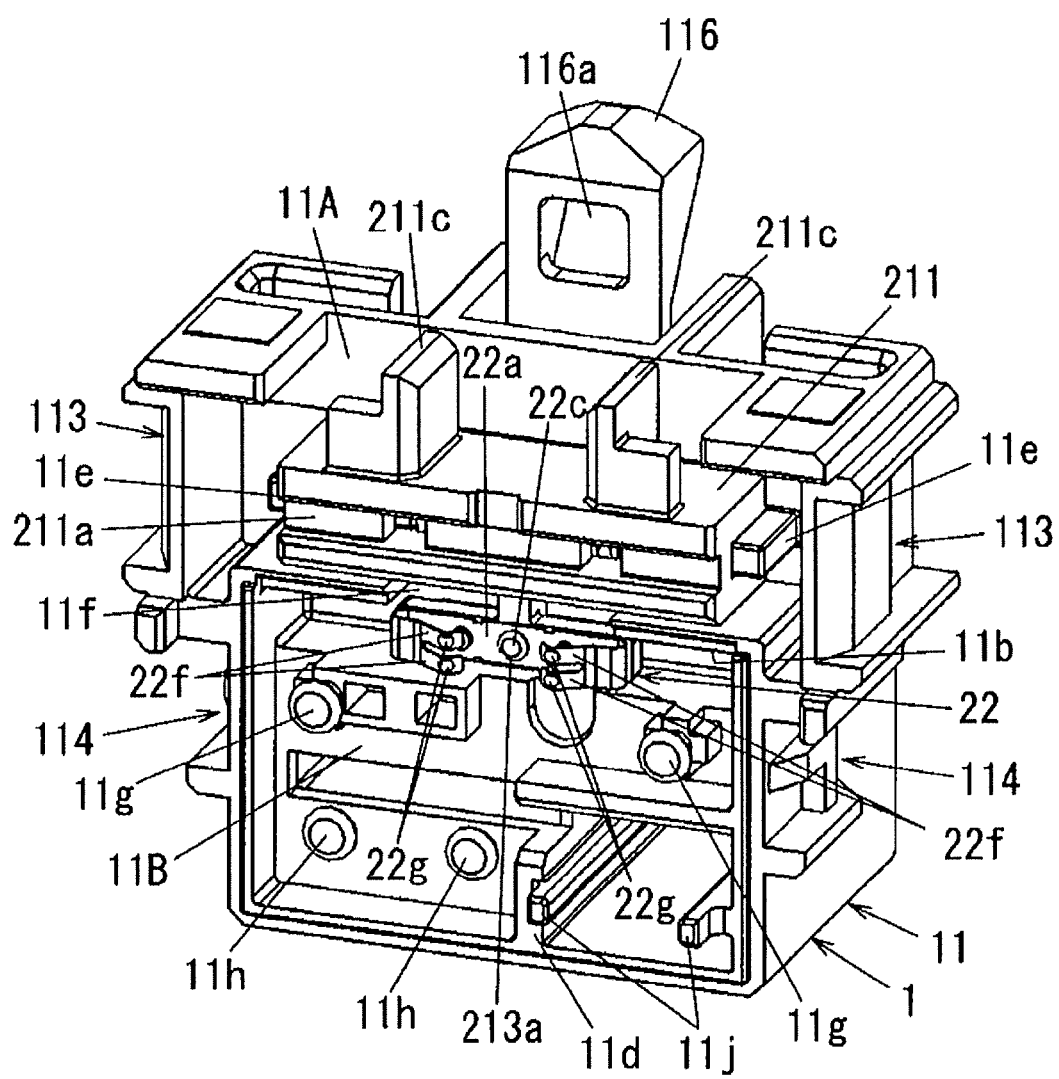
FIG. 9 is a schematic view of the switch unit.
Figure 10:
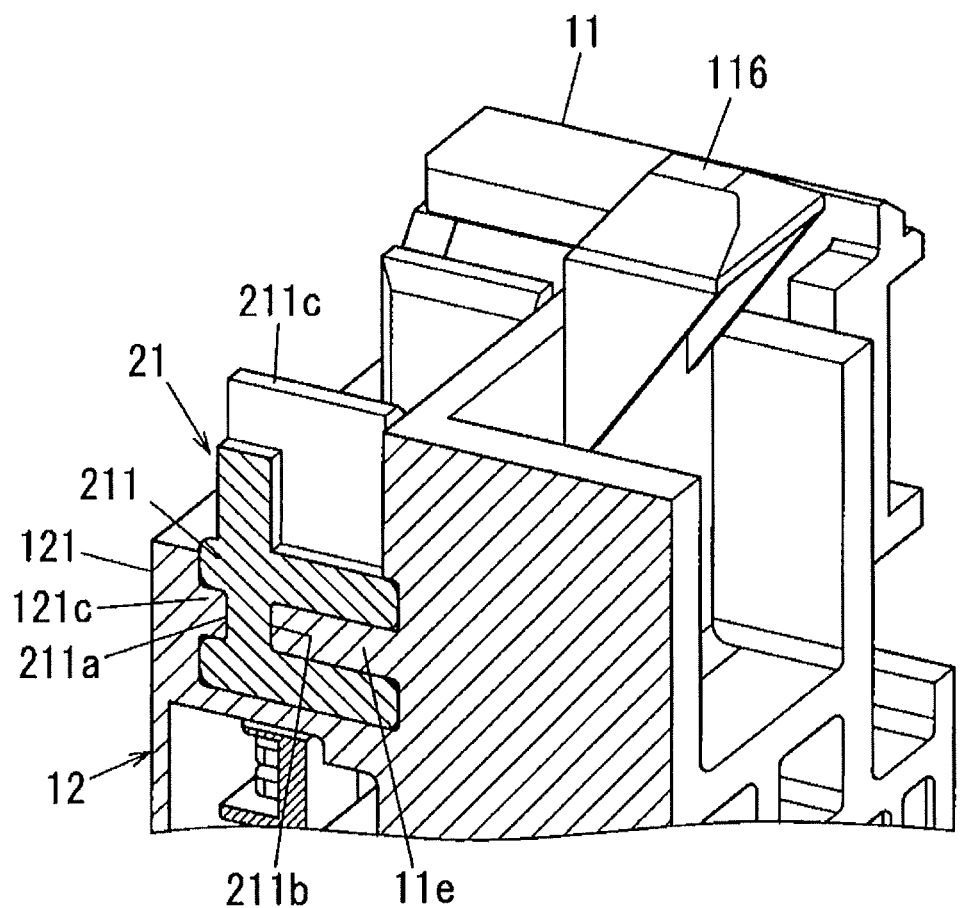
FIG. 10 is a section view depicting major portions of the switch unit.

Referring to FIGS. 9 and 10, the movable body 21 is stored within the storage compartment 11A. The guide protrusions 11e of the case body 11 are inserted into the groove portion 211b of the movable body 21. The left and right ends of the return spring 212 make contact with the guide protrusions 11e. As a result, the movable body 21 is arranged within the storage compartment 11A so that it can move in the left-right direction along the guide protrusions 11e.

As shown in FIGS. 8 and 9, the movable terminal stand 213 of the movable body 21 protrudes into the storage compartment 11B through a rectangular cutout 11f formed in the substantially central area of the partition wall 11b.

As can be seen in FIGS. 7 and 9, a pair of substantially cylindrical columnar locating protrusions 11g extending from the rear surface 11a of the case body 11 is arranged side by side in the left-right direction within the storage compartment 11B. Below the left locating protrusion 11g, a pair of substantially cylindrical columnar locating protrusions 11h is arranged side by side in the left-right direction.

Figure 11:
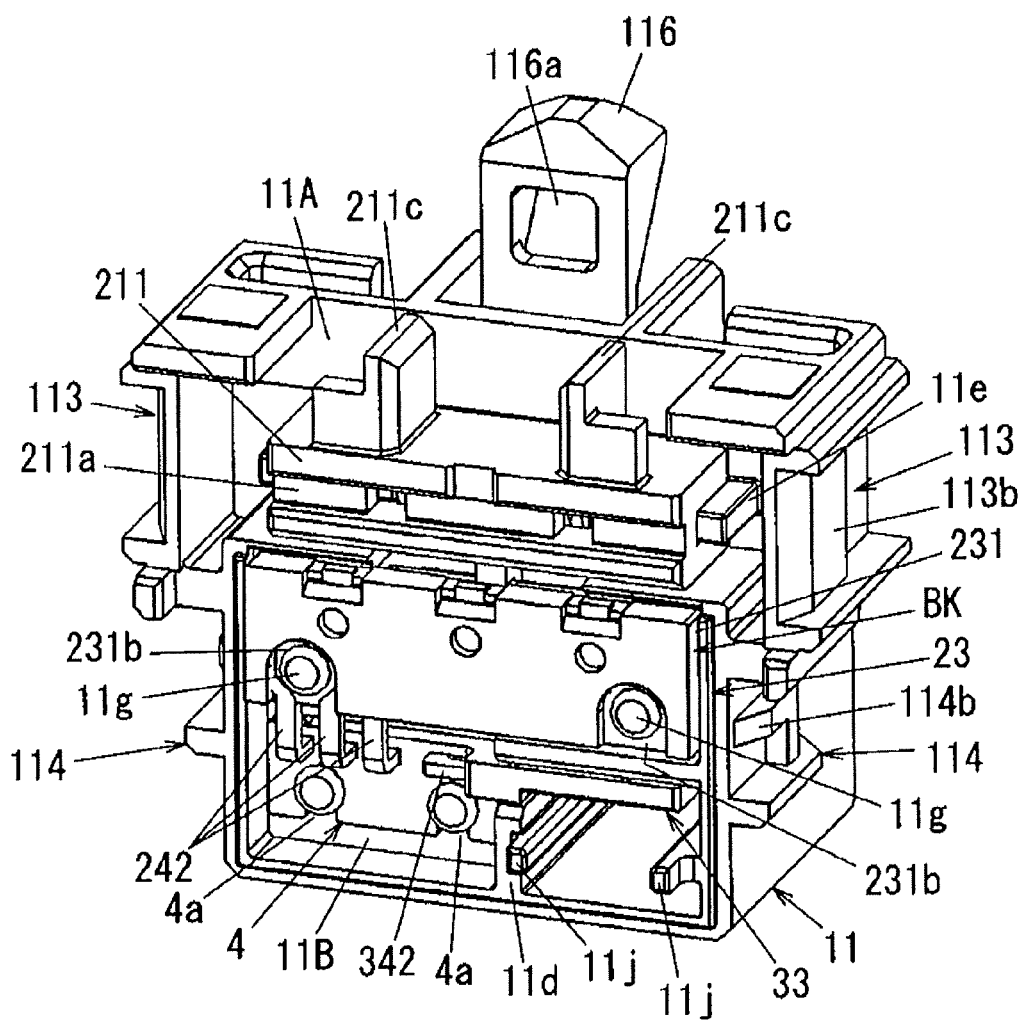
FIG. 11 is a schematic view of the switch unit.

Turning to FIG. 11, the fixed terminal block BK is stored within the storage compartment 11B. The locating protrusions 11g are inserted into the insertion holes 231b of the fixed terminal stand 23 of the fixed terminal block BK, thereby locating the fixed terminal stand 23 in position. The locating protrusions 11*h* are fitted to the cutouts 4*a* of the terminal holding body 4, eventually locating the terminal holding body 4 in position. Within the case body 11, the terminal holding body 4 and the fixed terminal stand 33 are arranged side by side in the left-right direction. The terminal holding body 4 and the fixed terminal stand 23 are arranged side by side in the up-down direction.

In the fixed terminal stand 23 stored within the storage compartment 11B, the rear surface of the fixed terminal stand 23, on, which the fixed contact plates 241 are exposed, is opposed to the movable contact member 22 of the movable body 21. At this time, the bulging portions 22*g* of the contact pieces 22*f* formed in the tip end portions of the bent pieces 22*b* of the movable contact member 22 come into contact with the fixed contact portion 241*a* of the fixed contact terminal 24B.

Figure 12:
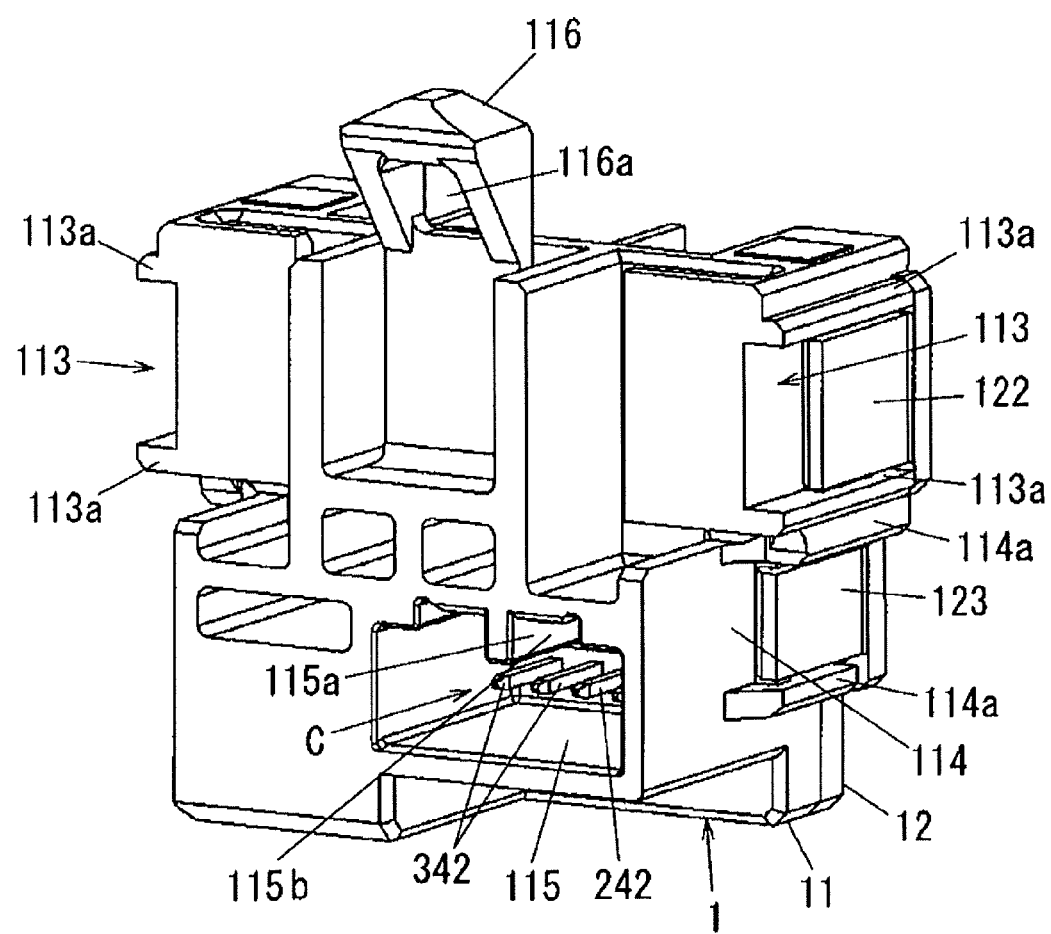
FIG. 12 is a rear perspective view of the switch unit.

Referring to FIG. 12, a substantially rectangular recess portion 115 is formed in the area of the rear surface of the case body 11 opposing to the terminal holding body 4 in the front-rear direction. A rectangular insertion hole 115*b* is formed on the bottom surface 115*a* of the recess portion 115. The terminal portions 242*a* and 342*a* of the fixed terminals 242 and 342 held by the terminal holding body 4 protrude into the recess portion 115 through the insertion hole 115*b*. The recess portion 115 and the fixed terminals 242 and 342 protruding into the recess portion 115 make up a connector socket C. A plug socket of signal lines extending from a control unit such as an ECU (engine control unit) not shown in the drawings is inserted into, and connected to, the connector socket C. Upon detecting the electric connection between the fixed contact terminals 34 though the signal lines as set forth later, the control unit switches the control modes from the AT mode to the MT mode. When the electric connection between the fixed contact terminals 24A and 24B is detected in the MT mode, the control unit performs an upshift control operation. When the electric connection between the fixed contact terminals 24B and 24C is detected in the MT mode, the control unit performs a down-shift control operation.

Figure 13A:
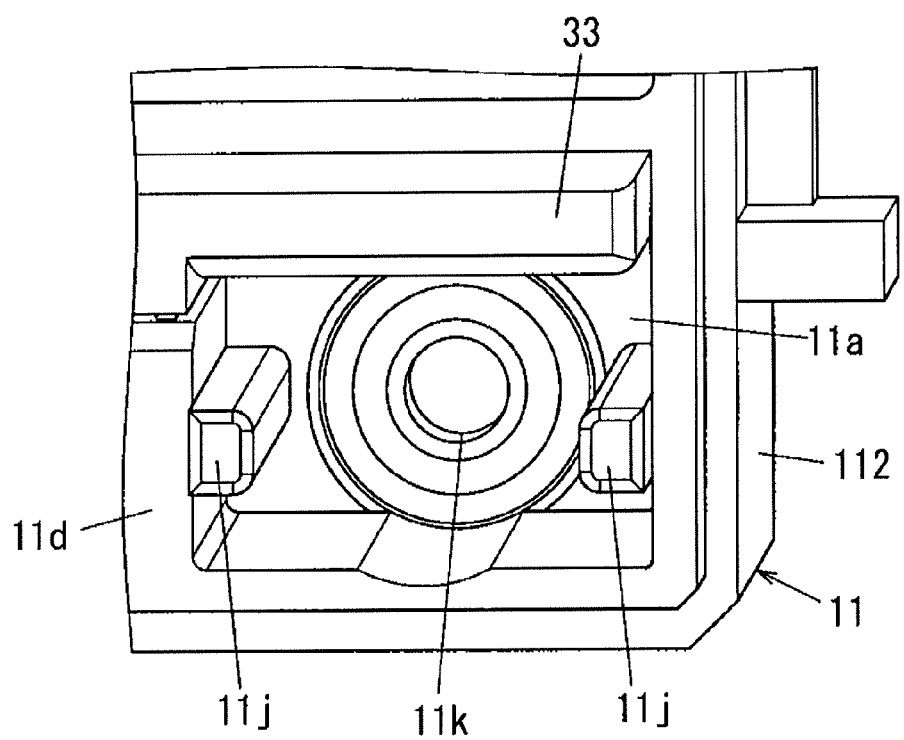
FIGS. 13A and 13B are enlarged views depicting major portions of the switch unit.

Referring to FIG. 13A, a wall portion 11*d* protruding upwards from the lower surface of the case body 11 is formed within the storage compartment 11B. Guide ribs 11*j* facing toward each other in the left-right direction protrude from the wall portion 11*d* and the right side surface 112 of the case body 11. The guide ribs 11*j* are formed into a rectangular parallelepiped shape along the front-rear direction.

A substantially cylindrical columnar protrusion 11*k* protrudes from the rear surface 11*a* of the case body 11 to extend between the guide ribs 11*j*.

Figure 13B:
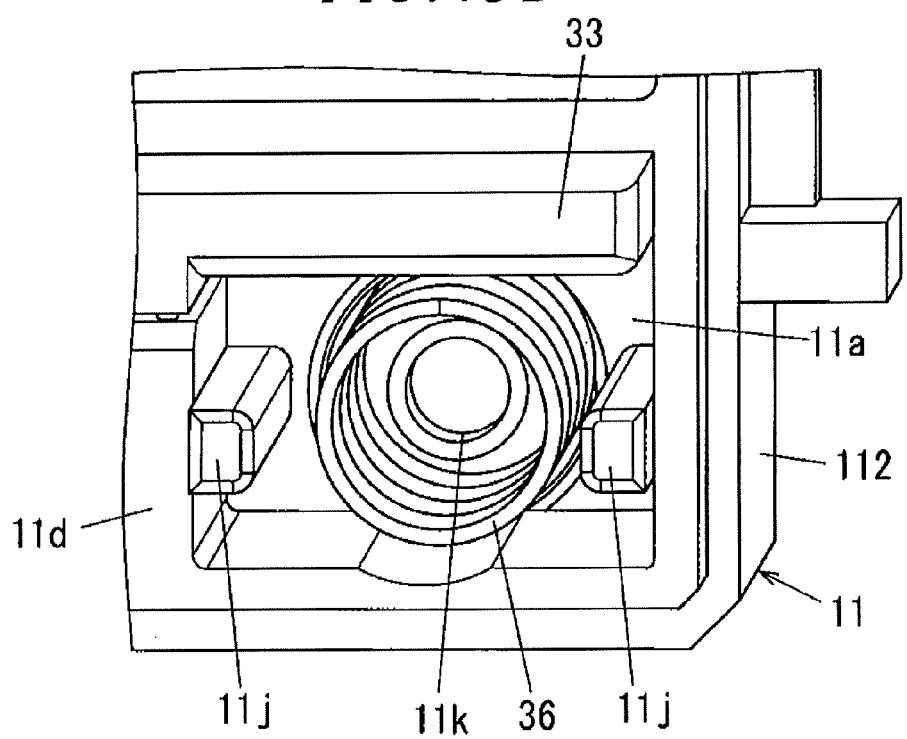
Figure 14:
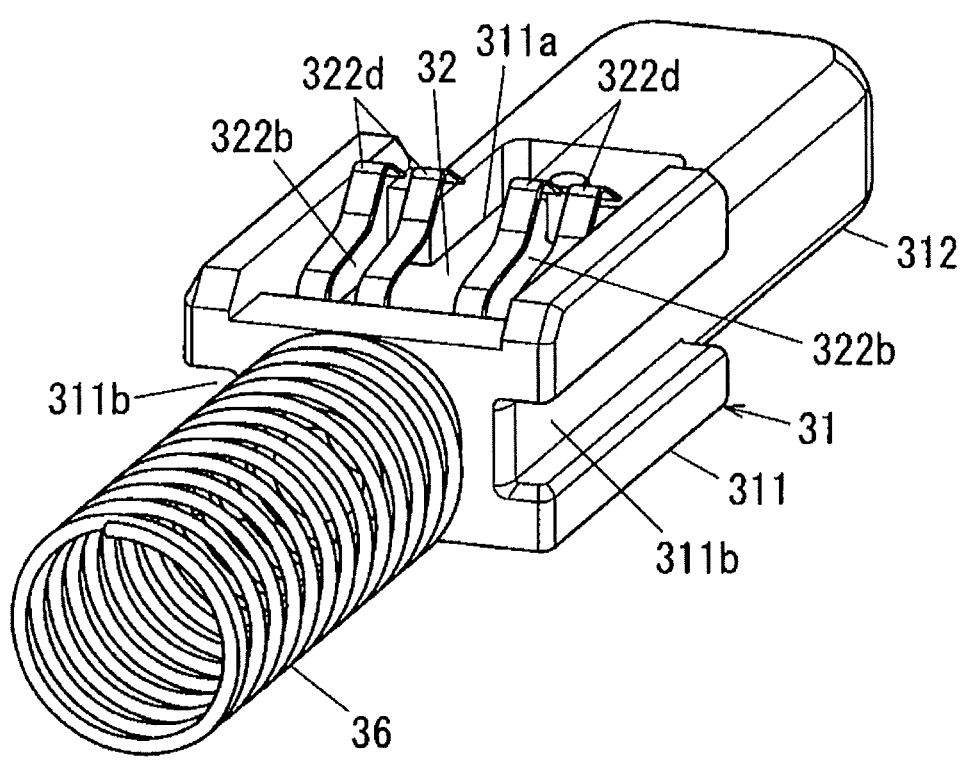
FIG. 14 is a rear perspective view showing the movable body employed in the switch unit.
Figure 15:
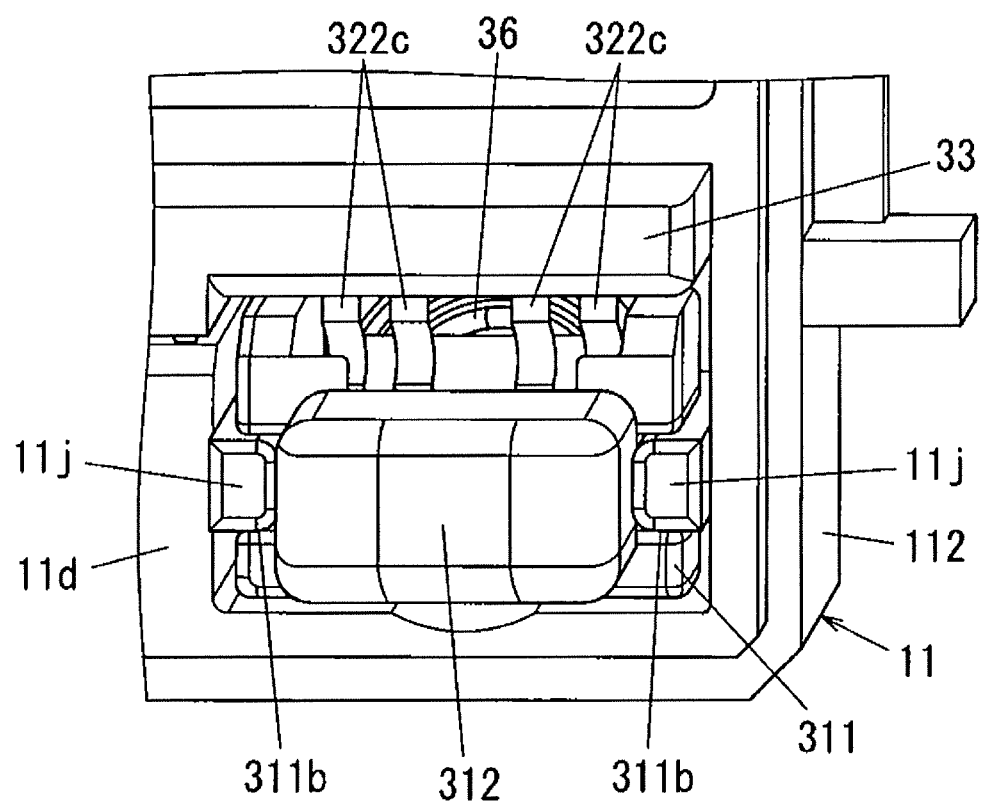
FIG. 15 is an enlarged view depicting major portions of the switch unit.

As shown in FIG. 13B, one end portion of a return spring 36 formed of a coil spring is fitted to the protrusion 11*k*. Thereafter, as shown in FIG. 14, the protrusion 311*c* of the movable body 31 is inserted into the other end portion of the return spring 36. Subsequently, as shown in FIG. 15, the movable body 31 is fitted between the guide ribs 11*j*. The guide ribs 11*j* are inserted into the slide grooves 311*b* formed on the left and right side surfaces of the movable body 31. As a result, the movable body 31 is supported in such a manner as to move along the guide ribs 11*j* in the front-rear direction.

Referring back to FIG. 8, a fixing portion 116 for fixing the switch unit to an installation portion (not shown) protrudes from the upper end of the case body 11. The fixing portion 116 is formed into a substantially triangular prism shape to have a width gradually increasing rearwards as it extends from the lower end to the upper end thereof. The fixing portion 116 has a substantially rectangular engaging hole 116*a* formed in the front-rear direction. Engaging claws formed in an installation portion not shown in the drawings engage with the engaging hole 116*a*, whereby the switch unit can be readily attached to the installation portion in a one-touch motion.

As shown in FIG. 6, the case cover 12 includes a top plate 121, a pair of engaging claws 122 extending from the left and right upper edges of the top plate 121 in a perpendicular relationship with the top plate 121, and a pair of engaging claws 123 arranged below the engaging claws 122 to extend in a perpendicular relationship with the top plate 121.

The top plate 121 is formed into a substantially rectangular plate-like shape to cover the opening of the case body 11. The top plate 121 has an insertion hole 121*a* formed in a corresponding relationship with the operation portion 312 of the movable body 31. The operation portion 312 is exposed to the outside from the insertion hole 121*a*.

A rectangular cutout 121*b* is formed in the upper end portion of the top plate 121. When the top plate 121 is attached to the case body 11, the wall portions 211*c* of the movable body 21 are exposed to the outside through the cutout 121*b*.

As shown in FIG. 10, a substantially rectangular parallelepiped guide protrusion 121*c* extending in the left-right direction is formed in the area of the rear surface of the top plate 121 opposing to the guide protrusion 11*e* of the case body 11. The guide protrusion 121*c* is inserted into the groove portion 211*a* formed on the front surface of the movable body 21. The guide protrusion 121*c* serves to guide the left-right movement of the movable body 21 in cooperation with the guide protrusion 11*e* inserted into the groove portion 211*b* formed on the rear surface of the movable body 21. This enables the movable body 21 to smoothly move in the left-right direction, thereby enhancing the operability of the movable body 21 (or the shift detecting switch 2).

Referring to FIG. 12, the engaging claws 122 and 123 are formed into a substantially rectangular plate-like shape. The tip end portions of the engaging claws 122 and 123 are bent inwards to form engaging pieces (not shown).

Guide grooves 113 are formed in the side walls 111 and 112 of the case body 11 to extend in the front-rear direction. Similarly, guide grooves 114 extending in the front-rear direction are formed in the side walls 111 and 112 of the case body 11 below the guide grooves 113. Engaging protrusions 113*a* and 114*a* protruding in the left-right direction are formed in the front areas of the guide grooves 113 and 114.

When the top plate 121 is attached to the case body 11, the engaging claws 122 and 123 are inserted into the guide grooves 113 and 114, and the engaging pieces 122*a* and 123*a* of the engaging claws 122 and 123 come into engagement with the engaging protrusions 113*b* and 114*b*. As a result, the case cover 12 is smoothly combined with, and fixed to, the case body 11.

Next, description will be given on the operation of the switch unit of the present embodiment configured as above.

If the shift lever is initially positioned at the AT mode side in the second shift route L2, the shift detecting switch 2 and the mode switching switch 3 of the switch unit are kept opened. In other words, no electric connection is made between the three fixed terminals 242 and between the two fixed terminals 342.

Subsequently, if the shift lever is moved along the second shift route L2 from the "D" range of the first shift route L1 to the "S" range of the third shift route L3, the operation portion 312 of the movable body 31 is directly or indirectly pushed by the shift lever. In response, the movable body 31 is moved rearwards while compressing the return spring 36 and is opposed to the fixed terminal stand 33. Then, the bulging portions 322*d* of the movable contact member 32 of the movable body 31 come into contact with the fixed contact plates 34 of the fixed terminal stand 33. In this regard, the tip end portion of the bent piece 322 of the movable contact member 32 is bifurcated into two pairs of contact pieces 322*c*. This helps increase the contact reliability when the bulging portions 322*d* make contact with the fixed contact plates 34. Moreover, the formation of the bulging portions 322*d* in the areas of the contact pieces 322*c* making contact with the fixed contact plates 34 assists in increasing the elasticity of the contact pieces 322*c* and further enhancing the contact reliability.

The fixed contact terminals 34 are electrically connected to each other through the movable contact member 32. The electric connection between the fixed contact terminals 34 is detected by an engine control unit which in turn performs a mode switching operation for switching the AT mode to the MT mode.

When the AT mode is switched to the MT mode, an operation member (not shown) operating together with the movement of the shift lever is fitted between the wall portions 211*c* of the movable body 21, thereby keeping the shift lever in the "S" range of the third shift route L3.

As the shift lever is shifted up and down along the third shift route L3, the operation member pushes the wall portions 211*c* and causes the movable body 21 to move in the left-right direction against the biasing force of the return spring 212. More specifically, when the shift lever is moved from the "S" range to the "+" range along the third shift route L3 (shifted up), the operation member pushes the wall portions 211*c* to the left. Thus, the movable body 21 is moved to the left. At this time, the movable contact member 22 fixed to the movable terminal stand 213 of the movable body 21 is moved to the left together with the movement of the movable body 21. The bent pieces 22*b* of the movable contact member 22 are slid to the left on the rear surface of the fixed terminal stand 23. The bulging portions 22*g* of one of the bent pieces 22*b* (the left bent piece) come into contact with the fixed contact terminal 24A. As a result, the fixed contact terminal 24A is electrically connected to the fixed contact terminal 24B that makes contact with bulging portions 22*g* of the other bent piece 22*b* (the right bent piece). The engine control unit detects the electric connection between the fixed contact terminals 24A and 24B and performs an up-shift control operation.

Thereafter, if the biasing force is removed from the shift lever, the movable body 21 is moved to the right by the restoring force of the return spring 212 and is automatically returned to the substantially central position (neutral position). In this regard, the tip end portion of the bent piece 22*b* of the movable contact member 22 is bifurcated into a pair of contact pieces 22*f*. This helps increase the contact reliability when the bent piece 22*b* makes contact with the fixed contact plates 24. Moreover, the formation of the bulging portions 22*g* in the areas of the contact pieces 22*f* making contact with the fixed contact plates 24 assists in increasing the elasticity of the contact pieces 22*f* and further enhancing the contact reliability.

When the shift lever is moved from the "S" range to the "−" range along the third shift route L3 (shifted down), the operation member pushes the wall portions 211*c* to the right contrary to the up-shift operation stated above. Thus, the movable body 21 is moved to the right. At this time, the movable contact member 22 fixed to the movable terminal stand 213 of the movable body 21 is moved to the right together with the movement of the movable body 21. The bent pieces 22*b* of the movable contact member 22 are slid to the right on the rear surface of the fixed terminal stand 23. The bulging portions 22*g* of one of the bent pieces 22*b* (the right bent piece) come into contact with the fixed contact terminal 24C. As a result, the fixed contact terminal 24C is electrically connected to the fixed contact terminal 24B that makes contact with bulging portions 22*g* of the other bent piece 22*b* (the left bent piece). The engine control unit detects the electric connection between the fixed contact terminals 24B and 24C and performs a down-shift control operation.

If the shift lever is moved from the MT mode side to the AT mode side, the biasing force is removed from the operation portion 312. Thus, the movable body 31 is pushed forwards by the restoring force of the return spring 36, and the bent pieces 322 are moved away from the fixed contact plates 34. As a result, the fixed terminals 342 are electrically disconnected from each other. Upon detecting the electric disconnection, the engine control unit switches the control modes from the MT mode to the AT mode.

In the switch unit of the present embodiment described above, the up-shift operation and the down-shift operation are detected by a single switch (the shift detecting switch 2), and the mode switching operation between the AT mode and the MT mode is detected by a single switch (the mode switching switch 3). That is to say, three kinds of operations can be detected by two switches. As compared with the conventional switch unit having three switches corresponding to three kinds of operations, it is therefore possible for the switch unit of the present embodiment to reduce the number of parts and to simplify the structure. This makes it possible to reduce the size of the switch unit.

In the switch unit of the present embodiment, it is possible to directly attach the shift detecting switch 2 and the mode switching switch 3 to the inside of the case 1 without having to store them within the case 1 independently of each other. This eliminates the need to provide different cases on a switch-by-switch basis, which makes it possible to further reduce the number of parts of the switch unit and the size of the switch unit.

Figure 19:
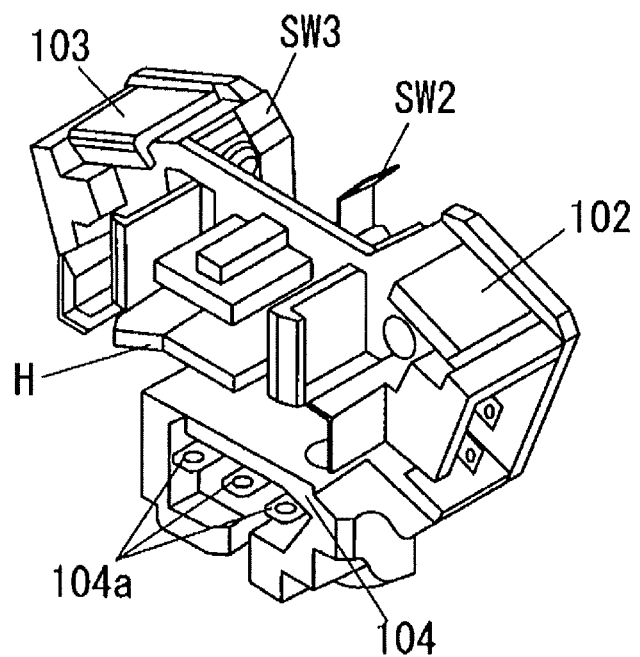
FIG. 19 is a schematic view of the conventional switch unit.

In the switch unit of the present embodiment, the output terminals (the fixed terminals 242 and 342) of the respective switches 2 and 3 are formed into an L-like shape. The tip end portions (the terminal portions 242*a* and 342*a*) of the respective output terminals are arranged side by side in the same direction within the recess portion 115 of the case body 11. The tip end portions (the terminal portions 242*a* and 342*a*) and the recess portion 115 make up a socket connector C. Therefore, it is not necessary that, as in the conventional switch unit shown in FIG. 19, the terminal unit 104 be provided within the housing H and the signal lines be provided between the terminals 104*a* and the respective switches SW1, SW2 and SW3 and soldered to the terminals 104*a* and the respective switches SW1, SW2 and SW3. Accordingly, the switch unit of the present embodiment is capable of reducing the number of parts due to the omission of such components as signal lines and capable of reducing the number of manufacturing steps due to the omission of such works as soldering.

In the switch unit of the present embodiment, the engine control unit and the respective switches can be readily connected to each other by merely connecting a plug connector of signal lines extending from a control unit such as an engine control unit to the socket connector C. In other words, the task of connecting the switch unit and the engine control unit can be easily performed through the use of connectors.

Figure 16:
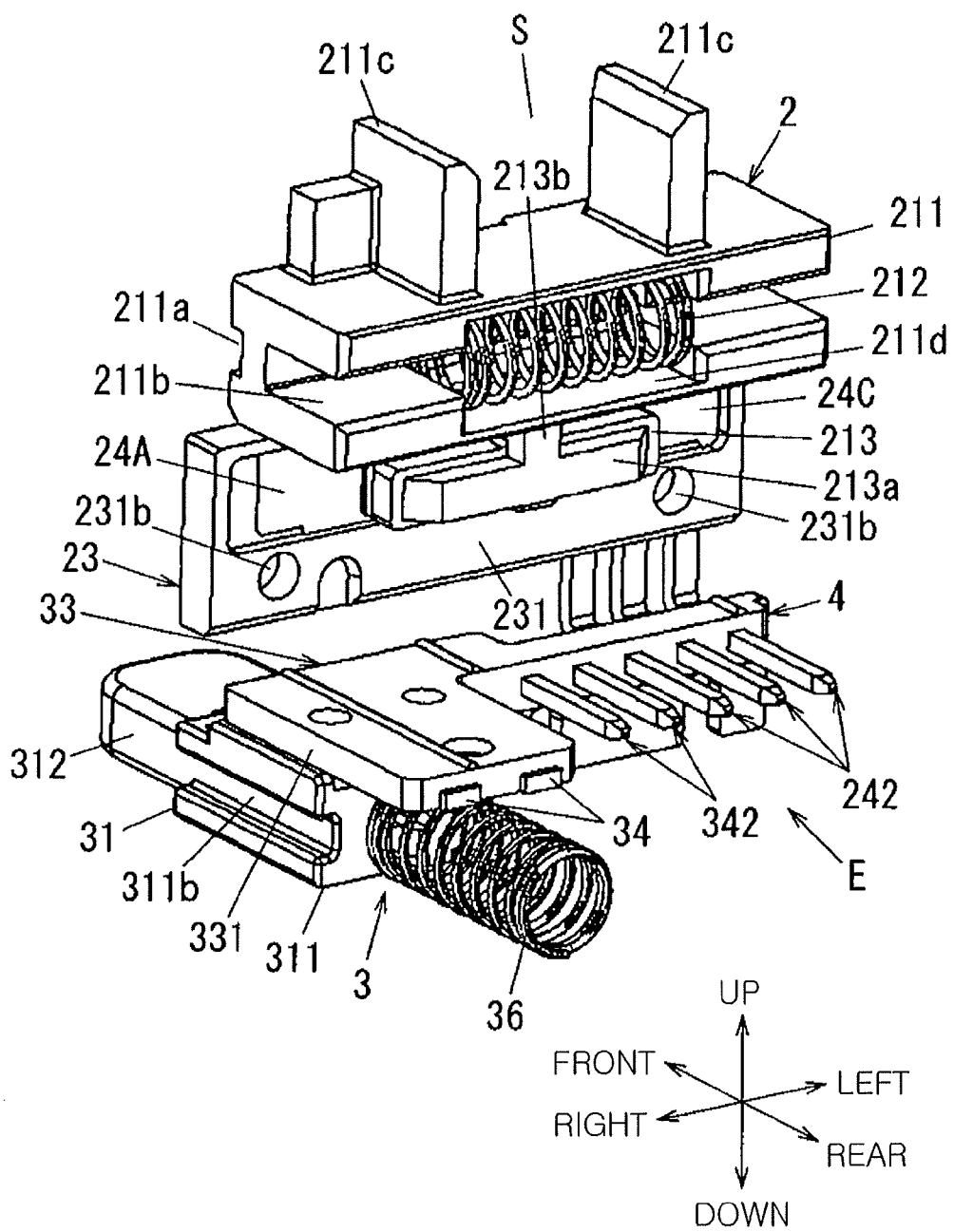
FIG. 16 is a perspective view depicting major portions of the switch unit.

In the switch unit of the present embodiment, as shown in FIG. 16, the fixed terminal stand 33 and the terminal holding body 4 are arranged side by side in the left-right direction along the lower end portion of the fixed terminal stand 23 extending in the up-down direction. The fixed terminal stand 33 is provided at the rear side of the fixed terminal stand 23 to extend in the front-rear direction. The terminal holding body 4 is provided to extend in a parallel relationship with the fixed terminal stand 23 (in the up-down direction). The movable body 21 is arranged in an opposing relationship with the rear surface of the fixed terminal stand 23. Therefore, a space E contiguous to the movable body 21 in the up-down direction and contiguous to the fixed terminal stand 33 in the left-right direction is formed at the rear side of the terminal holding body 4. Within the space E, the respective fixed terminals 242 and 342 extend in the same direction (the front-rear direction) to form the socket connector C. In the switch unit of the present embodiment, therefore, the thickness in the front-rear direction can be reduced by forming the socket connector C in the space E. This makes it possible to reduce the size of the switch unit.

While the invention has been shown and described with respect to the embodiments, it will be understood by those skilled in the art that various changes and modification may be made without departing from the scope of the invention as defined in the following claims.

What is claimed is:

1. A switch unit for detecting movement of a target object in a first direction and in a second direction orthogonal to the first direction, said switch unit comprising:
   a first movable body arranged to move in the first direction together with the movement of the target object in the first direction;
   a first substrate provided with a first detecting unit for detecting a position of the first movable body in the first direction;
   a second movable body arranged to move in the second direction together with the movement of the target object in the second direction; and
   a second substrate provided with a second detecting unit for detecting a position of the second movable body in the second direction,
   wherein the first detecting unit includes a plurality of first fixed contact points arranged side by side along the first direction, the first movable body being connectable to the first fixed contact points such that a connection state between the first movable body and the first fixed contact points varies with the position of the first movable body; and
   the second connecting unit includes a plurality of second fixed contact points arranged side by side within a plane extending in the second direction, the second movable body being connectable to the second fixed contact points such that a connection state between the second movable body and the second fixed contact points varies with the position of the second movable body.

2. The switch unit of claim 1, further comprising:
   a first fixed terminal for outputting a signal corresponding to the position of the first movable body, the first fixed terminal being connected to the first detecting unit and extending in the second direction; and
   a second fixed terminal for outputting a signal corresponding to the position of the second movable body, the second fixed terminal being connected to the second detecting unit and arranged side by side with respect to the first fixed terminal,
   wherein the first fixed terminal and the first fixed contact points are integrally formed with each other, and the second fixed terminal and the second fixed contact points are integrally formed with each other.

3. The switch unit of claim 1, wherein the first detecting unit includes a first molded member fixing the first fixed contact points together, and the second detecting unit includes a second molded member for fixing the second fixed contact points together.

4. A switch unit for detecting movement of a target object in a first direction and in a second direction orthogonal to the first direction, said switch unit comprising:
   a first movable body arranged to move in the first direction together with the movement of the target object in the first direction;
   a first substrate provided with a first detecting unit for detecting a position of the first movable body in the first direction;
   a second movable body arranged to move in the second direction together with the movement of the target object in the second direction; and
   a second substrate provided with a second detecting unit for detecting a position of the second movable body in the second direction,
   wherein the first detecting unit includes three first fixed contact points arranged side by side along the first direction, the first movable body being connectable to the first fixed contact points such that a connection state between the first movable body and the first fixed contact points varies with the position of the first movable body, and
   the second connecting unit including two second fixed contact points arranged side by side within a plane extending in the second direction, the second movable body being connectable to the second fixed contact points such that a connection state between the second movable body and the second fixed contact points varies with the position of the second movable body.

5. The switch unit of claim 4, further comprising:
   a first fixed terminal for outputting a signal corresponding to the position of the first movable body, the first fixed terminal being connected to the first detecting unit and extending in the second direction; and
   a second fixed terminal for outputting a signal corresponding to the position of the second movable body, the second fixed terminal being connected to the second detecting unit and arranged side by side with respect to the first fixed terminal,
   wherein the first fixed terminal and the first fixed contact points are integrally formed with each other, and the second fixed terminal and the second fixed contact points are integrally formed with each other.

6. The switch unit of claim 4, wherein the first detecting unit includes a first molded member fixing the first fixed contact points together, and the second detecting unit includes a second molded member for fixing the second fixed contact points together.

* * * * *

UNITED STATES PATENT AND TRADEMARK OFFICE
CERTIFICATE OF CORRECTION

PATENT NO.        : 8,624,135 B2
APPLICATION NO.   : 13/228722
DATED             : January 7, 2014
INVENTOR(S)       : Yukinori Fujikawa et al.

Page 1 of 1

It is certified that error appears in the above-identified patent and that said Letters Patent is hereby corrected as shown below:

In the Claims

At column 13, claim number 1, line number 46, please replace "the second connecting unit" with "the second detecting unit."

At column 14, claim number 4, line number 34, please replace "the second connecting unit" with "the second detecting unit."

Signed and Sealed this
Seventh Day of October, 2014

Michelle K. Lee
*Deputy Director of the United States Patent and Trademark Office*